US008856530B2

(12) United States Patent
Patti et al.

(10) Patent No.: US 8,856,530 B2
(45) Date of Patent: Oct. 7, 2014

(54) DATA STORAGE INCORPORATING CRYPTOGRAPHICALLY ENHANCED DATA PROTECTION

(75) Inventors: Joseph G. Patti, Short Hills, NJ (US); Michael Lamberg, Massapequa Park, NY (US)

(73) Assignee: Onyx Privacy, Inc., Short Hills, NJ (US)

( * ) Notice: Subject to any disclaimer, the term of this patent is extended or adjusted under 35 U.S.C. 154(b) by 137 days.

(21) Appl. No.: 13/238,581

(22) Filed: Sep. 21, 2011

(65) Prior Publication Data
US 2013/0073854 A1    Mar. 21, 2013

(51) Int. Cl.
*H04L 9/32* (2006.01)
*H04L 9/08* (2006.01)

(52) U.S. Cl.
CPC ............ *H04L 9/0825* (2013.01); *H04L 9/0894* (2013.01); *H04L 9/088* (2013.01)
USPC ........................................ 713/171

(58) Field of Classification Search
CPC ........... H04L 9/32; H04L 29/02; H04L 29/08; H04L 9/0894; H04L 9/0825
USPC ........................................ 713/171
See application file for complete search history.

(56) References Cited

U.S. PATENT DOCUMENTS

| 5,343,527 A | 8/1994 | Moore et al. |
|---|---|---|
| 5,369,702 A | 11/1994 | Shanton |
| 5,495,533 A | 2/1996 | Linehan et al. |
| 5,584,022 A | 12/1996 | Kikuchi et al. |
| 5,719,938 A | 2/1998 | Haas et al. |
| 5,787,175 A | 7/1998 | Carter |
| 5,940,507 A | 8/1999 | Cane et al. |
| 5,953,419 A | 9/1999 | Lohstroh et al. |
| 6,530,020 B1 | 3/2003 | Aoki |
| 6,694,025 B1 | 2/2004 | Epstein et al. |
| 6,708,272 B1 | 3/2004 | McCown et al. |
| 6,839,843 B1 | 1/2005 | Bacha et al. |
| 6,912,285 B2 | 6/2005 | Jevens et al. |
| 6,978,025 B1 | 12/2005 | Price |

(Continued)

OTHER PUBLICATIONS

Wilkinson et al. "Trustworthy Access Control with Untrustworthy Web Servers." Computer Security Applications Conference, 1999. (ACSAC '99). Dec. 1999.

(Continued)

*Primary Examiner* — Teshome Hailu
*Assistant Examiner* — Abiy Getachew
(74) *Attorney, Agent, or Firm* — Kramer Amado P.C.

(57) ABSTRACT

Various exemplary embodiments relate to a system for storing encrypted data and providing access to a group of users. The system may include: a record of user accounts including: a user identifier and a public encryption key; an access control list (ACL) defining an access control policy including: permissions defining access to data objects associated with the ACL and an ACL key list including copies of a an ACL key encrypted with the public keys of the users; a user-data storage medium including: encrypted user data, stored as a plurality of data objects, each object associated with an ACL and encrypted with the ACL key, and meta-data; and an access controller configured to: receive a request for a data object, and send a copy of the data object and the ACL key encrypted with the public key of the user if the user has permission to access the data object.

12 Claims, 8 Drawing Sheets

(56) References Cited

U.S. PATENT DOCUMENTS

| | | | |
|---|---|---|---|
| 6,981,138 | B2 | 12/2005 | Douceur et al. |
| 7,131,010 | B2 | 10/2006 | Okaue et al. |
| 7,146,009 | B2 | 12/2006 | Adivahis et al. |
| 7,171,001 | B2 | 1/2007 | Tuvell et al. |
| 7,178,021 | B1 * | 2/2007 | Hanna et al. ............ 713/155 |
| 7,215,778 | B2 | 5/2007 | Grobman |
| 7,260,555 | B2 | 8/2007 | Rossman |
| 7,346,774 | B2 | 3/2008 | Douceur et al. |
| 7,499,551 | B1 | 3/2009 | Mire |
| 7,509,492 | B2 | 3/2009 | Boyden et al. |
| 7,562,232 | B2 | 7/2009 | Zuili |
| 7,577,258 | B2 | 8/2009 | Wiseman |
| 7,596,222 | B2 | 9/2009 | Jonas |
| 7,685,645 | B2 | 3/2010 | Doyle et al. |
| 7,729,995 | B1 | 6/2010 | Alain |
| 2006/0288210 | A1 * | 12/2006 | Hansen ............ 713/168 |
| 2009/0165124 | A1 * | 6/2009 | Spektor ............ 726/21 |
| 2009/0193267 | A1 * | 7/2009 | Chung ............ 713/193 |
| 2010/0095118 | A1 | 4/2010 | Meka |
| 2012/0246463 | A1 * | 9/2012 | Shea et al. ............ 713/153 |

OTHER PUBLICATIONS

Ford et al. "A Key Distribution Method for Object-Based Protection." CCS '94: Proceedings of the 2nd ACM Conference on Computer and communications security. Nov. 1994.

Peticolas et al. "WebGroup: a secure group access control tool for the World-Wide Web." Enabling Technologies: Infrastructure for Collaborative Enterprises, 1998. (WET ICE '98). Jun. 19, 1998.

Adya et al., "FARSITE: Federated, Available, and Reliable Storage for an Incompletely Trusted Environment," SIGOPS Operating Systems Review; Dec. 2002, 36, SI, pp. 1-14.

Harrington et al., "Cryptographic access control in a distributed file system," Symposium on Access Control Models and Technologies; 2003, pp. 158-165.

Grolimund et al. Crytree: A Folder Tree Structure for Cryptographic File Systems. http://www.wuala.com/en/learn/technology.

* cited by examiner

| ACL ID: 203982 — 405 |
| ACL Owner: Bob — 410 |
| ACL Namespace — 415 |

| Username | Permissions 430 | | | Encrypted ACL Key 440 |
| | Read | Write | Admin | |
| --- | --- | --- | --- | --- |
| Alice | YES | YES | NO | E(ACL Key 1, Alice)<br>E(ACL Key 2, Alice) |
| Bob | YES | YES | YES | E(ACL Key 1, Bob)<br>E(ACL Key 2, Bob) |
| Carl | YES | NO | NO | E(ACL Key 2, Carl) |
| Dave | NO | NO | YES | NONE |

420 — Username column
450a — Alice row
450b — Bob row
450c — Carl row
450d — Dave row

DATA STORAGE INCORPORATING CRYPTOGRAPHICALLY ENHANCED DATA PROTECTION

FIELD OF THE INVENTION

This invention relates generally to data storage and communication using cryptography.

BACKGROUND OF THE INVENTION

Cryptography is used to share information among permitted parties while preventing access by undesired third parties. Cryptography is particularly useful in computer communication networks because information is often sent over untrusted networks and computers have the processing power to perform complex cryptographic algorithms. Symmetric encryption involves the use of a key shared by each of the permitted parties. The same symmetric key may be used for both encryption and decryption. Asymmetric encryption involves the use of a pair of keys, where one key is kept private and the other key is known publically. Hybrid encryption involves the combination of symmetric and asymmetric encryption.

Although symmetric, asymmetric, and hybrid encryption algorithms are known, most computer users do not make use of existing encryption systems. Computer users often communicate and send files or other data objects in unencrypted form leaving them vulnerable to privacy leaks and identity theft. For many users, existing cryptographic systems are confusing and cumbersome. Users may also be overwhelmed at the prospect of keeping track of numerous cryptographic keys, yet are reluctant to trust third parties or servers with the cryptographic keys.

Modern communications services do not have a secure infrastructure. Data may be routed along various pathways, possibly including foreign countries, without a user knowing which route is taken. Wireless communications may be easily intercepted. With the advent of cloud computing, services traditionally provided by trusted servers may now be farmed out to virtual machines which could be physically located anywhere.

SUMMARY OF THE INVENTION

In light of the present need for a cryptographic system providing secure storage, communication and file sharing, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a system for storing encrypted data and providing access to a group of users. The system may include one or more of: a record of user accounts, wherein at least one record for a user account includes: a user identifier, and a public encryption key corresponding to a private encryption key known to the user and unknown to the server; at least one access control list (ACL) defining an access control policy for a group of users, wherein the ACL includes: permissions for the group of users, wherein each user of the group has access to a plurality of data objects associated with the ACL as defined by the permissions, and an ACL key list including, for each authorized user of the group, a copy of a symmetric key corresponding to the ACL (ACL key) encrypted with the public encryption key of the user; a user-data machine readable storage medium including: encrypted user data, stored as a plurality of data objects, each object associated with an ACL and encrypted with the ACL key, and meta-data that describes the at least one data object including an identifier of the ACL associated with the data object; and an access controller configured to: receive, from a user, an access request from a user requesting access to a requested data object, and send, to the user, a copy of the requested encrypted data object to the user if the ACL associated with the data object indicates that the user has permission to access the data object, and send, to a user, the copy of the ACL key encrypted with the public key of the user.

In various alternative embodiments, the data objects may be messages, and all messages for the group of users may be associated with the same ACL. Additionally, the ACL may further include a namespace scheme that indicates how the plurality of data objects associated with ACL are stored. In various alternative embodiments, the permissions are stored as cleartext. Various alternative embodiments further include an authentication controller configured to: receive data objects sent to the system by a user that have been digitally signed with the private encryption key known to the user; authenticate the data object by applying the user public key; generate an accounting record including at least the identifier of the user and a time of receipt; and store the accounting record as meta-data associated with the data object. In various alternative embodiments, the record of user accounts may include at least one administrative account and the record of at least one other user account may be linked to the administrative account, wherein the access control module requires an administrative account to have access to any ACL to which the linked user account has access.

Various exemplary embodiments relate to a method, performed by a client device, of storing a plurality of encrypted data objects on a partially trusted server, the method comprising: receiving, from a first user, an indication of a data object and an Access Control List (ACL); requesting, from the server, an ACL and a copy of an ACL key encrypted with a public key corresponding to the first user; decrypting the copy of the ACL key with a private key of the first user matching the public key; encrypting the data object with the decrypted ACL key; and sending, to the server, the encrypted data object and meta-data describing the data object, including at least an identifier of the ACL and an identifier of the data object.

Various alternative embodiments may further include: signing the encrypted data object with the private key; and receiving, from the server, an accounting record indicating at least a time when the data object was received by the server. In various alternative embodiments, the step of encrypting the data object includes: randomly or pseudo-randomly generating a unique initialization vector for the data object, and encrypting the data object using the unique initialization vector. Additionally, the method may include: receiving, from the server, a public key of a second user; encrypting the ACL key with the public key of the second user; adding an identifier for the second user, permissions for the second user, and the encrypted ACL key to the ACL; and sending the ACL to the server. Various alternative embodiments include signing the ACL with the private key of the first user. Various alternative embodiments may also include: requesting the public key for each user in the ACL; generating a new ACL key; encrypting the new ACL key with the public key of each user; storing the new encrypted ACL keys in the ACL; and sending the ACL to the server. Various alternative embodiments also include: removing the identifier of a user, the permissions of the user, and the encrypted ACL key of the user from the ACL; and sending, to the server, a request to revoke access of the user, including the ACL.

Various exemplary embodiments relate to a method performed by a server for securely storing a plurality of encrypted data objects: receiving, from a client device associated with a first user, a request for an Access Control List (ACL) stored on the server, the ACL including: permissions for a group of users, wherein each authorized user of the group has access to a plurality of data objects associated with the ACL as defined by the permissions, and an ACL key list including, for each authorized user of the group, a copy of a symmetric key corresponding to the ACL (ACL key) encrypted with a public encryption key of the authorized user; transmitting the ACL and an encrypted ACL key for the first user to the client device; receiving, from the client device, a write request including a data object encrypted with the ACL key and meta-data including at least an identifier of the ACL and an identifier of the data object; verifying the permission of the first user to write within the ACL by comparing an identifier of the first user with permissions of the first user in the ACL stored on the server; and storing the data object and meta-data on the server only if the first user has permission to write within the ACL.

In various alternative embodiments, the step of verifying includes: verifying the identity of the first user by decrypting a digital signature on the data object using the public key of the first user stored on the server; generating an accounting record of the write request; and storing the accounting record as meta-data describing the data object. In various alternative embodiments, the data object is not a file, and the meta-data describes raw disk partitions for locating the data object. In various alternative embodiments, the method further includes: receiving, from a client device, a request to revoke access to data objects within an ACL, the request including a new ACL and an identifier of a requesting user; verifying the permission of the requesting user to change the ACL by comparing the identifier of the requesting user with the permissions in the stored ACL; storing the new ACL on the server if the requesting user has permission to change the ACL. Additionally, in such embodiments, the new ACL may include a new ACL key list including, for each user of the group, a copy of a new symmetric ACL key encrypted with the public encryption key of the user. In various alternative embodiments, the ACL includes a plurality of encrypted ACL keys for at least one user in the group and the meta-data for each data object further includes an identifier of the ACL key used to encrypt the data object. In various alternative embodiments, the method further includes: receiving, from a client device, a request for a data object or meta-data describing a data object, the request including an identifier of a requesting user; verifying the permission of the requesting user to read data objects within the ACL by comparing the identifier of the requesting user with the permissions in the stored ACL; sending, to the client device, if the requesting user has permission, the requested data object or requested meta-data.

The foregoing objects and advantages of the invention are illustrative of those that can be achieved by the various exemplary embodiments and are not intended to be exhaustive or limiting of the possible advantages that can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

BRIEF DESCRIPTION OF THE DRAWINGS

In order to better understand various exemplary embodiments, reference is made to the accompanying drawings, wherein.

DETAILED DESCRIPTION

Cryptographic systems are not effective unless they are used regularly for private communications. Users will not use a cryptographic system if they are required to specifically encrypt individual files and track the required keys for decryption. Users cannot be expected to securely maintain a large number of encryption keys for communication with multiple parties. Furthermore, users of a communication system have little knowledge regarding where their data travels or where it is stored. Users should assume that communications networks are insecure and that anyone could access data while it is being transmitted. Users should also assume that data stored remotely may be subject to attacks or other unauthorized access.

In view of the foregoing, there exists a need for a system and method for secure, transparent cryptographic communication and data object storage among groups of users. There exists a further need for a communications and storage service that provides secure communication without requiring users to trust a third party with access to unencrypted data or cryptographic keys.

Referring now to the drawings, in which like numerals refer to like components or steps, there are disclosed broad aspects of various exemplary embodiments.

Figure 1:
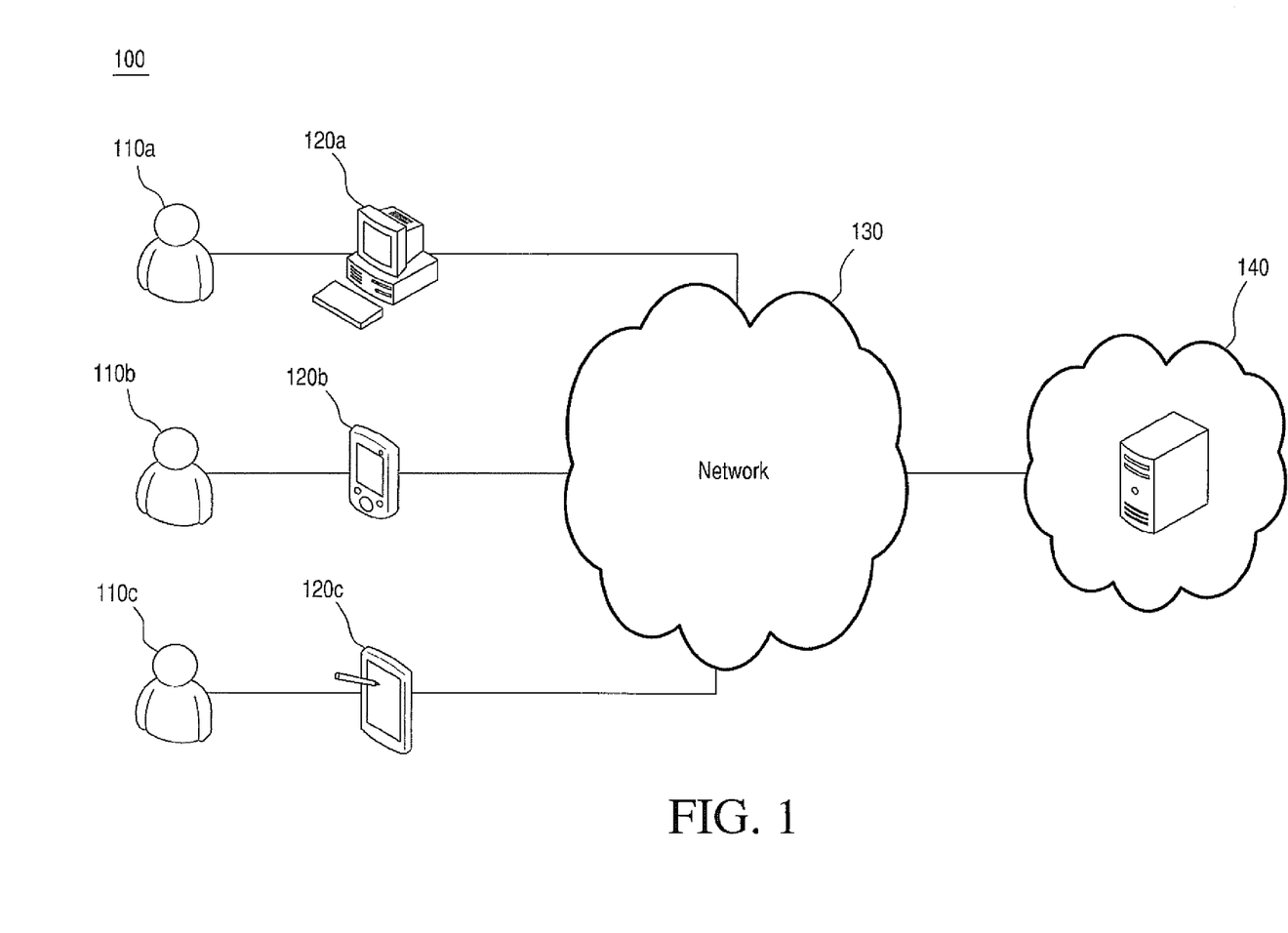
FIG. 1 illustrates an exemplary communications network for providing cryptographic communication.

FIG. 1 illustrates an exemplary system 100 for providing cryptographic communication. Exemplary system 100 may include: users 110, user devices 120, network 130, and server 140.

Users 110 may include any person who wants to access the system 100. Users 110 may be located in various physical locations. As described in further detail below regarding FIG. 8, users 110 may create a username for identification to system 100. An individual person may create more than one username and may be viewed by the system 100 as more than one user. Users 110 may be charged a fee for access to system 100.

User devices 120 may include any device capable of performing cryptographic operations and communicating digital messages with system 100. User devices 120 may include common computing devices such as personal computers, notebook computers, tablet computers, personal digital assistants, mobile phones and other electronic devices. An exemplary user device 120 is described in further detail below regarding FIG. 2.

Network 130 may include any network capable of transmitting digital messages. Network 130 may transmit messages between user devices 120 and server 140. Network 130 may use a variety of technology to transmit digital messages and may use different technology along different portions of the communications path. Network 130 may be a device or group of devices adapted to provide communication between other devices of exemplary system 100. Accordingly, network 130 may include a number of routers and/or switches for forwarding packets to appropriate destinations. In various embodiments, network 130 may include one or more 2G, 3G, and/or 4G systems. Further, in various embodiments, network 130 may include the Internet. Network 130 need not provide a secure communication link because all private data traversing network 130 may be encrypted.

Server 140 may be any computing device capable of storing data objects and managing access to the stored data objects. Server 140 may be an individual server including at least one processor, memory, storage device or network interface. Server 140 may also include a virtual server provided by a cloud computing service. Server 140 may be capable of performing cryptographic operations, but does not store the private cryptographic keys of the users or the unencrypted ACL keys. Server 140 may use known client-server encryption and authentication protocols such as HTTPS and SSL to provide additional security for cleartext communications. Server 140 may hold a certificate issued by a recognized commercial certificate authority. Server 140 may be described in further detail below regarding FIG. 3.

Figure 2:
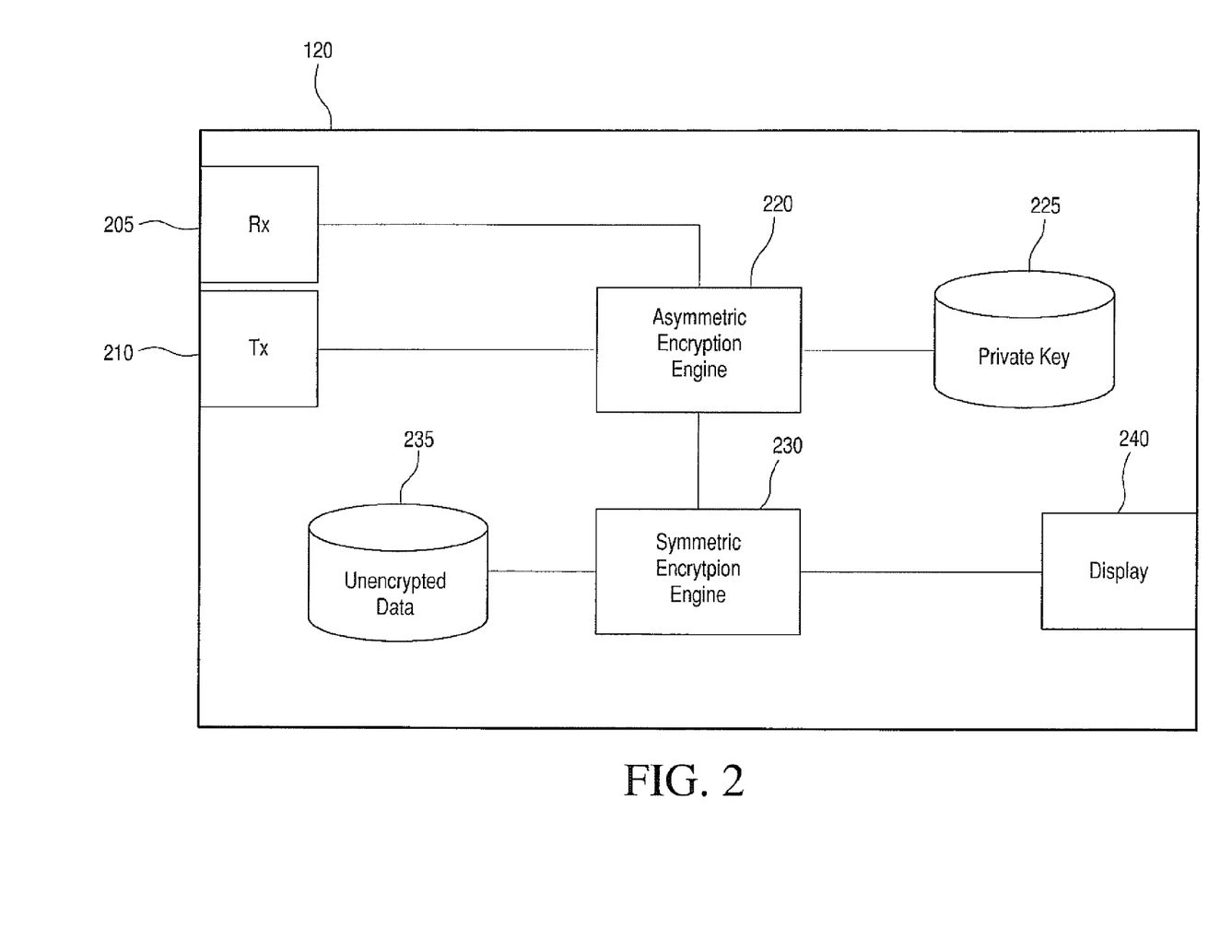
FIG. 2 illustrates an exemplary user device for cryptographically communicating with a communications network.

FIG. 2 illustrates an exemplary user device 120 for cryptographically communicating with a communications network. Exemplary user device 120 may include: receiver 205, transmitter 210, asymmetric cryptographic engine 220, private key storage 225, symmetric cryptographic engine 230, unencrypted data 235, and display 240.

Receiver 205 may be a device for receiving digital messages from system 100. Receiver 205 may include devices such as network interface cards, wireless adapters, and antennae. Receiver 205 may translate received data into a format understood by user device 120.

Transmitter 210 may be a device for transmitting digital messages to system 100. Transmitter 210 may include devices such as network interface cards, wireless adapters, and antennae. Transmitter 210 may translate data from user device 120 into a format understood by system 100. Transmitter 210 may be the same physical component as receiver 205.

Asymmetric cryptographic engine 220 may perform asymmetric encryption or decryption processes. Asymmetric cryptographic engine 220 may include hardware circuits designed to implement asymmetric processes and/or asymmetric cryptographic engine 220 may include a general processor programmed to perform asymmetric encryption processes. A variety of asymmetric encryption protocols may be used. In a preferred embodiment, asymmetric cryptographic engine 220 uses the RSA protocol. Asymmetric cryptographic engine 220 may create an asymmetric private-public key pair during the creation or modification of a username. The requirements for a private-public key pair depend on the asymmetric protocol used. The private key may be stored in private key storage 225, and the public key may be published to server 140 for access by other users 110. Asymmetric cryptographic engine 220 may access private key storage 225 to access the private-public key pair necessary to perform asymmetric encryption/decryption.

Asymmetric cryptographic engine 220 may encrypt and decrypt symmetric ACL keys. Asymmetric cryptographic engine 220 may encrypt a single symmetric ACL key multiple times using a plurality of public encryption keys to generate an equal number of encrypted ACL keys. Each encrypted ACL key may only be decrypted by a party holding the private key corresponding to the public key used to encrypt the ACL key. In a preferred embodiment, asymmetric cryptographic engine 220 is not used to encrypt data objects.

Asymmetric cryptographic engine 220 may also be used to provide signatures and authentication. Asymmetric cryptographic engine 220 may sign messages or a hash of the message using the private key. Client device 120 may be authenticated by sending a challenge that asymmetric cryptographic engine 220 must decrypt with the private key.

Private key storage 225 may be a computer readable storage medium for storing a private-public key pair used by asymmetric cryptographic engine 220. Private key storage 225 may include only a single private key. Private key storage 225 may include additional keys if a user creates multiple usernames, updates the private-public key pair for a username, or stores private keys used for other purposes. Private key storage 225 may be password protected to prevent unauthorized access to the private key. Private key storage 225 may use a persistent and/or redundant storage medium to prevent loss of the private key. If a user 110 wants to use the same username on multiple user devices 120, the user may copy a private key stored in private key storage 225 to any additional user device 120.

Symmetric cryptographic engine 230 may perform symmetric encryption and decryption processes. Symmetric cryptographic engine 230 may include hardware circuits designed to implement symmetric processes and/or symmetric cryptographic engine 230 may include a general processor programmed to perform symmetric encryption processes. A variety of symmetric encryption protocols may be used such as, for example, the AES protocol. Symmetric cryptographic engine 230 may use a symmetric ACL key decrypted by asymmetric cryptographic engine 220.

Symmetric cryptographic engine 230 may encrypt data objects such as messages, files, or any other data. Symmetric cryptographic engine 230 may receive unencrypted data objects from unencrypted data storage 235. Symmetric cryptographic engine 230 may secure a data object by performing an encryption protocol only a single time using a single symmetric ACL key. Once the encrypted data object is stored on server 140, any party authorized to access the encrypted data object and the correct unencrypted symmetric ACL key may access the file.

Symmetric ACL keys may be generated by a user 110 on a user device 120 when a user creates an ACL group. Generally, symmetric ACL keys may be generated by a random or pseudo-random process to provide security. User input may also be used to generate a symmetric ACL key. Once an ACL group has been established, symmetric cryptographic engine 230 may obtain the unencrypted symmetric ACL key from the output of asymmetric cryptographic engine 220 that decrypts an encrypted symmetric ACL key using the user's private key.

Unencrypted data storage 235 may provide unencrypted data objects to symmetric cryptographic engine 230. Unencrypted data storage 235 may be any computer readable storage medium such as, for example, RAM, flash memory, hard drive, or optical disc. In various alternative embodiments, unencrypted data storage 235 may be a stream of data.

Display 240 may include any device for communicating with a user 110. Display 240 may include, for example, a computer monitor, LCD screen, television, printer, storage medium, or any other device for outputting data from client device 110. Display 240 may allow user 110 to view unencrypted data and also interact with client device 110.

Figure 3:
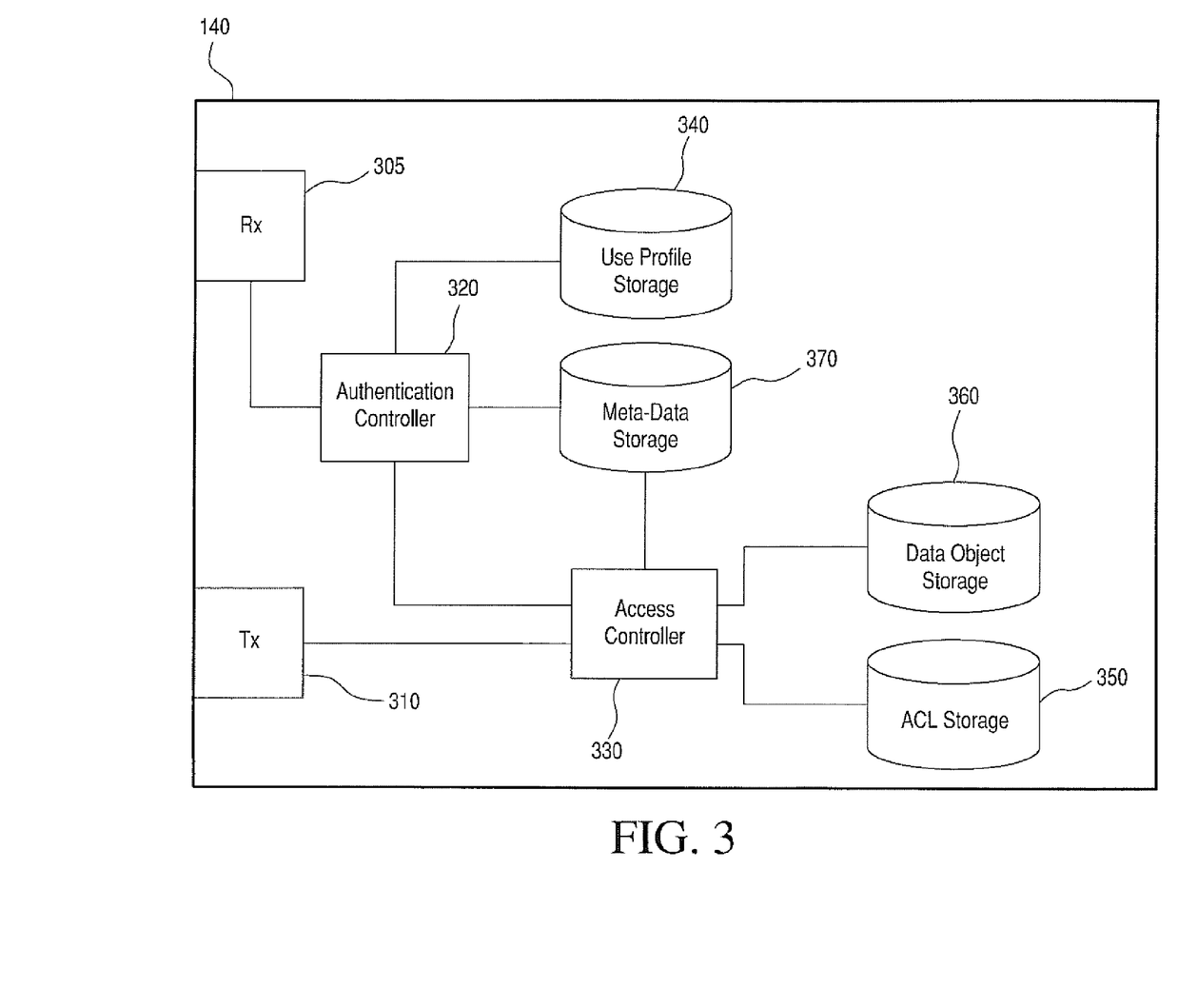
FIG. 3 illustrates an exemplary server for storing and managing access to encrypted data objects.

FIG. 3 illustrates an exemplary server 140 for storing and managing access to encrypted data objects. Exemplary server 140 may include receiver 305, transmitter 310, authentication controller 320, access control 330, user profile storage 340, ACL storage 350, data object storage 360 and meta-data storage 370.

Receiver 305 may be a device for receiving digital messages from system 100. Receiver 305 may include devices such as network interface cards, wireless adapters, and antennae. Receiver 305 may translate received data into a format understood by the server 140.

Transmitter 310 may be a device for transmitting digital messages to system 100. Transmitter 310 may include devices such as network interface cards, wireless adapters, and antennae. Transmitter 310 may translate data from the server 140 into a format understood by user device 120. Transmitter 310 may be the same physical component as receiver 305.

Authentication controller 320 may determine whether messages from a user are authentic messages from the registered username. In this manner, authentication controller 320 may prevent imposters from accessing or writing data objects. Authentication controller 320 may access user profile storage 340 to determine the public key of the user 110. Authentication controller 320 may use a challenge-response protocol to authenticate user 110.

Authentication controller 320 may also generate accounting records for data objects and store the accounting records as meta-data. Authentication controller 320 may record the time of any data object transaction along with a signature attached to the data object. Accounting records may be used to detect attempts at unauthorized access. Accounting records may also provide version tracking, accountability for changes, and the ability to recover deleted data objects or undo changes.

Access controller 330 may determine whether or not to provide requested data to a user 110. Access controller 330 may receive requests for ACLs, data objects, and/or meta-data. Requests for data may include an identifier of the user such as, for example, a username and an identifier for the requested data, such as an object identifier and/or an ACL identifier. In the case of an ACL, access controller 330 may access ACL storage 350 and compare the username with the users and permissions listed in the ACL. If the username is allowed to read data objects stored in the ACL, access controller 330 may provide the requesting user 110 with the encrypted ACL key. If the username is allowed to modify the ACL, access controller 330 may provide the entire ACL including the permissions and encrypted ACL keys of other users to the requesting user 110.

Access controller 330 may also determine whether to store a data object according to a user request. Access controller 330 may receive write requests including a new data object and an ACL identifier. Access controller 330 may also receive requests to update an existing data object. When access controller 330 receives a write or update request, access controller 330 may determine whether the requesting username has permission to associate a new data object with ACL or replace an existing data object by checking the ACL permissions. If the username has permission to write, access controller may store the data object in data object storage 360. If a user requests to update the ACL, access controller 330 may check whether the username has permission to modify the ACL.

User profile storage 340 may be a computer readable storage medium for storing user profiles for users 110. User profile storage 340 may use a database to store user profiles. Each user profile may include: a username, public key, personal information, billing information, and/or other data associated with a user. The username and public key may be available to other users, so that users may be added to ACLs.

User profile storage 340 may include supervised user accounts that have a supervisor. Such accounts may be useful for situations where an employer or parent needs to have access to data objects belonging to an employee or child. In various exemplary embodiments, the supervised user profile of a child or employee may be associated with a second user profile of a corresponding supervisor user profile. When any user attempts to add the supervised user to an ACL, server 140 may provide notice of the supervisor user profile and require any user adding the supervised user to also add the supervisor user to the ACL. In various alternative embodiments, the supervised user profile may include only the public key of the supervisor. When a user attempts to add the supervised user to an ACL, the user may instead add the supervisor. The supervisor may then actively add the supervised user to the ACL by retrieving the supervisor's encrypted ACL key, unencrypting the ACL key, generating an encrypted symmetric ACL key for the supervised user, and storing the encrypted ACL key in the ACL on server 140. This alternative embodiment ensures that the supervisor actively approves the supervised user's access to the ACL.

ACL storage 350 may be a computer readable storage medium for storing ACLs. User profile storage 340 may use a database to store ACLs. Each access control list may include: an ACL identifier, a list of usernames, permissions for each username, and one or more encrypted ACL keys for each username. ACL storage 350 may be described in more detail below regarding FIG. 4.

Data object storage 360 may be a computer readable storage medium for storing encrypted data objects. User profile storage 360 may use a database to store data objects. Generally, encrypted data objects may be treated by server 140 as raw data because server 140 cannot decrypt the encrypted data objects. Encrypted data objects may be referenced by raw disk partitions to provide access to the encrypted data objects. Data objects within data object storage 360 may be identified by a data object identifier and may be associated with an ACL identifier.

Meta-Data storage 370 may be a computer readable storage medium for storing meta-data about encrypted data objects. Meta-data storage 370 may use a database to store meta-data. Meta-data may be associated with encrypted data objects and use the data object identifier as an identifier of the meta-data. Meta-data may include: data object names, accounting records, encryption methods, ACL key identifiers, initialization vectors, and any other data useful for managing data objects. Meta-data storage 370 may include both cleartext meta-data and encrypted meta-data. For example, meta-data accessed by the server such as accounting records may be stored in clear text, whereas meta-data related to the contents of the data object such as the data object name may be encrypted.

Figure 4:
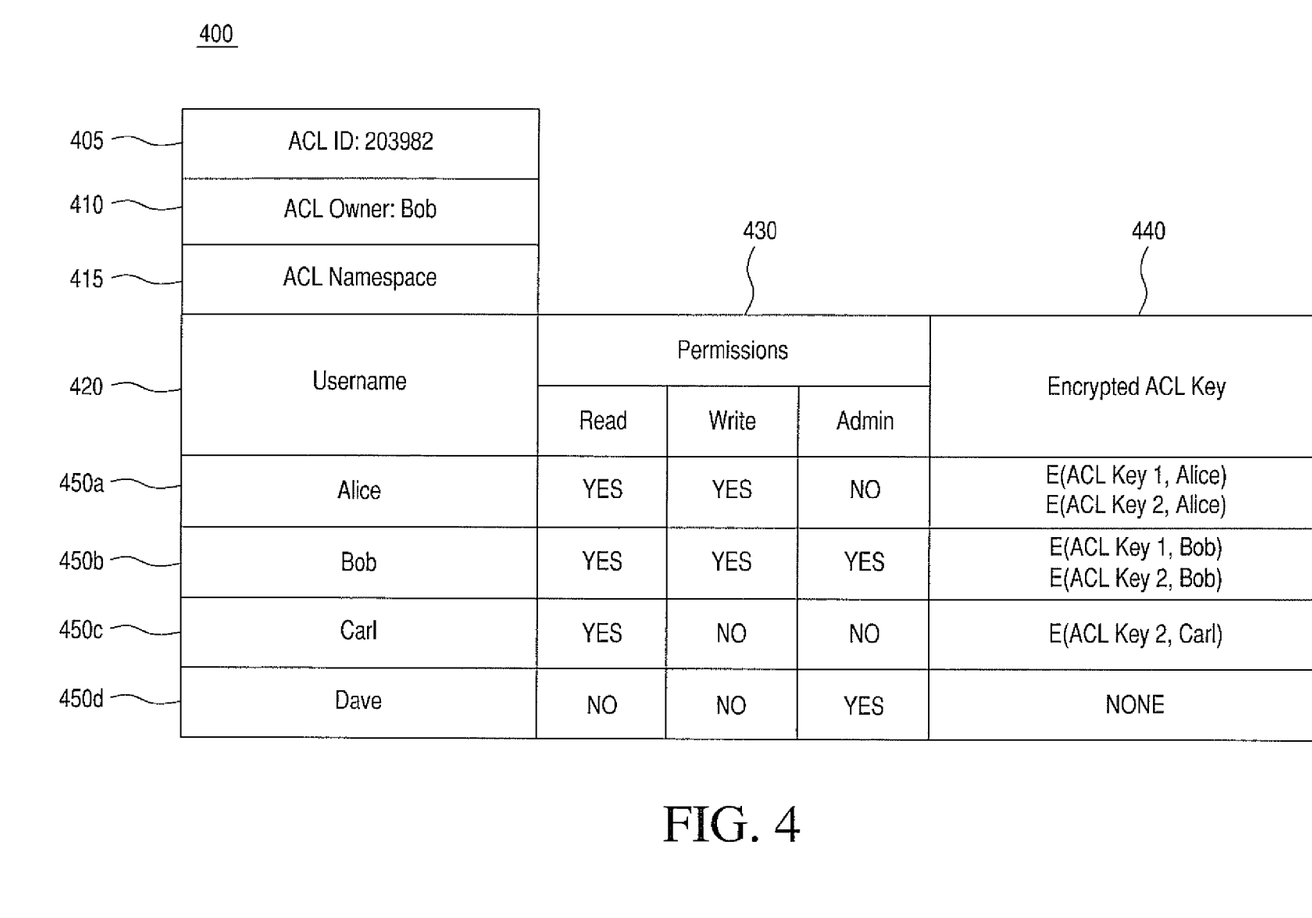
FIG. 4 illustrates an exemplary data structure for storing an Access Control List.

FIG. 4 illustrates an exemplary data structure 400 for storing an Access Control List. It should be understood that a variety of data structures may be used to store the information within data structure 400 such as, for example, database tables, arrays, linked lists, or trees. Generally, ACL storage 350 may include a data structure similar to data structure 400 for each ACL stored on the server. Data structure 400 may include multiple fields for information about an ACL. Data structure 400 may include: ACL identifier field 405, ACL owner field 410, ACL namespace field 415, username field 420, permissions field 430, and encrypted ACL key field 440. Data structure 400 may include additional fields that may be used to store information regarding an ACL. Data structure 400 may include multiple entries 450. Each entry 450 may correspond to a user 110 with access to the ACL.

ACL identifier field 405 may indicate an identifier for the ACL. ACL identifier field 405 may be used in other data structures to refer to data structure 400. The ACL identifier may be assigned by the server 140 when a user 11.0 creates a new ACL. ACL owner field 410 may indicate a user 110 who has complete control over the ACL. In exemplary data structure 400, ACL owner field indicates that a username "Bob" is the owner of the illustrative ACL. In some embodiments, a user 110 who creates an ACL may be the ACL owner. ACL owner field 410 may use a username to identify the owner. ACL namespace field 415 may indicate a namespace or other naming convention used to identify objects associated with the ACL. Client devices 120 may use namespace field 415 when generating an identifier for a data object.

Username field 420 may indicate the username of one or more users 110 who have some level of access to the ACL. The username field 420 may be linked to user profile storage 340 ensuring that only registered users may access the ACL and ensuring that server 140 may authenticate requests using the public key of the registered user. Each username field 420 may be associated with a permissions field 430 and encrypted ACL key field 440 to form an entry 450.

Permissions field 430 may indicate the access rights of the user 110 associated with the username in username field 420. Permissions field 430 may include multiple sub-fields indicating different access rights. For example, permissions field may include sub-fields for read access, write access, administrative access, create access, delete access and/or other uses of the data. Alternatively, permissions field 430 may include a code that indicates different combinations of access rights.

Encrypted ACL key field 440 may store one or more encrypted ACL keys of a user 110 indicated by username field 420. The encrypted ACL keys stored in encrypted ACL key field 440 may have been encrypted with a public key and may be useful only to a user holding the matching private key. In various exemplary embodiments using a plurality of encrypted symmetric keys, each key may be associated with a version identifier allowing server 140 to identify the correct key for each data object. Server 140 may not have access to the private key and may be unable to decrypt the encrypted keys.

As an example of a possible ACL, exemplary data structure 400 includes several entries 450. It should be understood that entries 450 are for illustrative purposes only and may include simplifications of the data that may be stored in data structure 400.

Exemplary entry 450a may be an entry for a user who is identified by the username "Alice" as indicated by username field 420. Exemplary entry 450a may further indicate that Alice has permission to read and write data objects within the ACL, but does not have administrative rights to the ACL. Exemplary entry 450a may also include two encrypted ACL keys that may be decrypted by Alice's private key. Data objects associated with the ACL may have been encrypted with either key. The permissions granted in exemplary entry 450a may be typical of a user who is expected to contribute to the ACL group.

Exemplary entry 450b may be an entry for a user who is identified by the username "Bob" as indicated by username field 420. Exemplary entry 450b may further indicate that Bob has permission to read, write, and administer data objects within the ACL. Exemplary entry 450b may also include two encrypted ACL keys that may be decrypted by Bob's private key. Data objects associated with the ACL may have been encrypted with either key. The permissions 430 granted in exemplary entry 450b may be typical of a user who is the owner of an ACL group and has complete control over the ACL. In various exemplary embodiments, each ACL group must have at least one owner. The administrative permission of entry 450b may allow the owner to revoke the access of another user in the ACL. The owner may revoke access by removing the read and/or write permissions of the other user. Although the user whose access has been revoked may still maintain an encrypted symmetric ACL key and the private key necessary to decrypt it, the user may be unable to access the data stored on server 140, because the server may enforce the permissions 430. In various exemplary embodiments, the owner may create further security by creating a new symmetric ACL key, and providing an encrypted copy of the symmetric ACL key for each user remaining in the ACL. The new ACL key may then be used to encrypt any new data objects. The new ACL key may also be used to re-encrypt any previously stored data objects if it is desired to have a single ACL key.

Exemplary entry 450c may be an entry for a user who is identified by the username "Carl" as indicated by username field 420. Exemplary entry 450c may further indicate that Carl has permission only to read data objects within the ACL. Exemplary entry 450c may also include an encrypted ACL key that may be decrypted by Carl's private key. The permissions granted in exemplary entry 450c may be typical of a user with limited access to the ACL.

Exemplary entry 450d may be an entry for a user who is identified by the username "Dave" as indicated by username field 420. Exemplary entry 450d may further indicate that Dave has permission only to administer the ACL. Exemplary entry 450d may also indicate that Dave does not have an encrypted ACL key. The permissions granted in exemplary entry 450d may be typical of a special administrator account used only to manage the ACL. The exemplary entry 450d may not have access to the contents of encrypted data objects. Moreover, even though Dave may change the permissions in the ACL, Dave is unable to grant itself access to the encrypted data objects because there is no encrypted ACL key for Dave. A special administrator account may held by a server administrator or other $3^{rd}$ party. Such an account may be useful for access recovery or holds on access. For example, if an ACL owner such as entry 450b (Bob) were to lose the private key stored on his client device 120, no one would have administrative rights to the ACL. A special administrator, however, would be able to restore Bob's ownership rights by granting another user, such as entry 450a (Alice) temporary permission to change the ACL. Alice could then generate an encrypted ACL key for Bob based on a new public key for Bob. A special administrator could also place a temporary hold on ACL activity by disabling all permissions if, for example, unauthorized access is reported and the ACL owner is unavailable.

Figure 5:
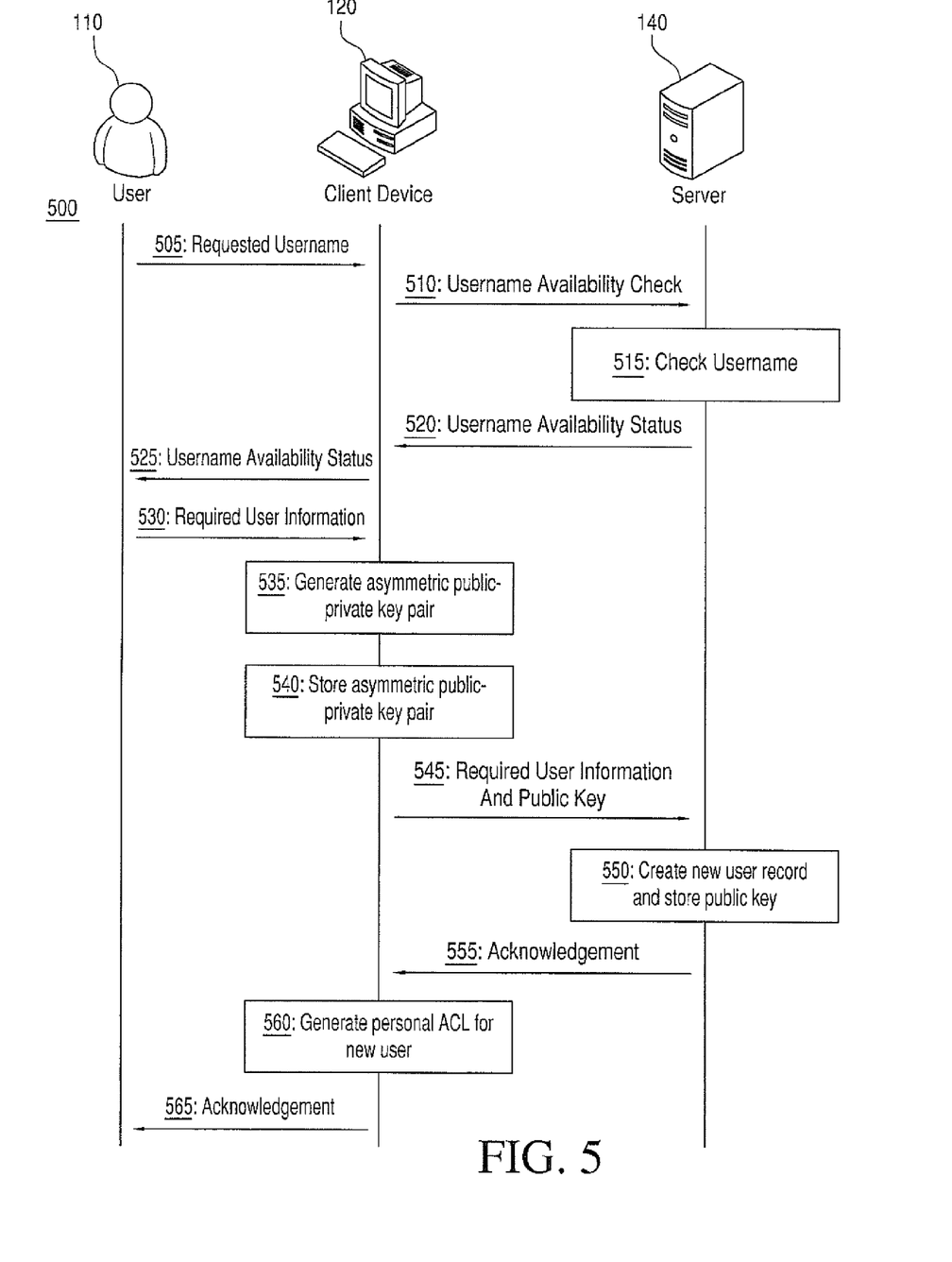
FIG. 5 illustrates and exemplary method of creating a new user account.

FIG. 5 illustrates an exemplary method 500 of creating a new user account. Method 500 may be performed by the various components of system 100 including user 110, client device 120, network 130, and server 140. It should be recognized that the steps performed by each individual component may be viewed as a separate method. Method 500 may involve components sending and/or receiving data. It should be recognized that sending and receiving may be viewed as separate steps for each component.

Method 500 may begin at step 505 when user 110 requests a new username. User 110 may request a new username by entering the desired username on client device 120. The method may then proceed to step 510, where client device 120 may send a username availability check to server 140. The username availability check may include the desired username. When server 140 receives the username availability check, the method 500 may proceed to step 515. In step 515, server 140 may determine whether the desired username is available by searching user profile storage 340. In step 520, server 140 may send a message to client device 120 indicating whether the desired username is available.

In step 525, client device 120 may communicate the availability of the desired username to client 110. If the desired username was not available, client device 120 may request another desired username, and the method 500 may begin again. If the desired username was available, client device 120 may request user 110 to provide additional user information. For example, client device 120 may require client 110 to provide personally identifying information for security and billing purposes. In step 530, client 110 may enter the requested information on client device 120.

In step 535, client device 120 may generate an asymmetric public-private key pair for the new username of user 110. Client device 120 may use asymmetric cryptographic engine 220 to generate the public-private key pair. The public-private key pair may be generated independently of the username or any other information previously known to server 140. The resulting public-private key pair may include two parts: a user private key and a user public key. In step 540, client device 120 may locally store both the private key and the public key. In various preferred embodiments, the private key is protected by a password or other security device. In step 545, client device 120 may send the user information and the public key to server 140. In various preferred embodiments, client device 120 may not send the private key to server 140.

In step 550, server 140 may create a user profile for the new username and store the profile in user profile storage 340. The user profile may include the received username, the received public key, and any other information provided by user 110. Server 140 may also perform account maintenance activities such as processing payment for the new user account.

In step 555, server 140 may send an acknowledgement message to client device 120 indicating that the new user account has been created and is available. In step 560, client device 120 may create a personal ACL for the user 110. The creation of an ACL may be described in further detail below regarding FIG. 6. The personal ACL may be owned by the user 110, have full permissions for the user 110, and be used for private storage. In step 565, client device 120 may display an acknowledgment to the user 110 indicating that a user account and personal ACL have been created. Client device 120 may also instruct user 110 on security precautions regarding the user private key. Method 500 may end after step 565.

Figure 6:
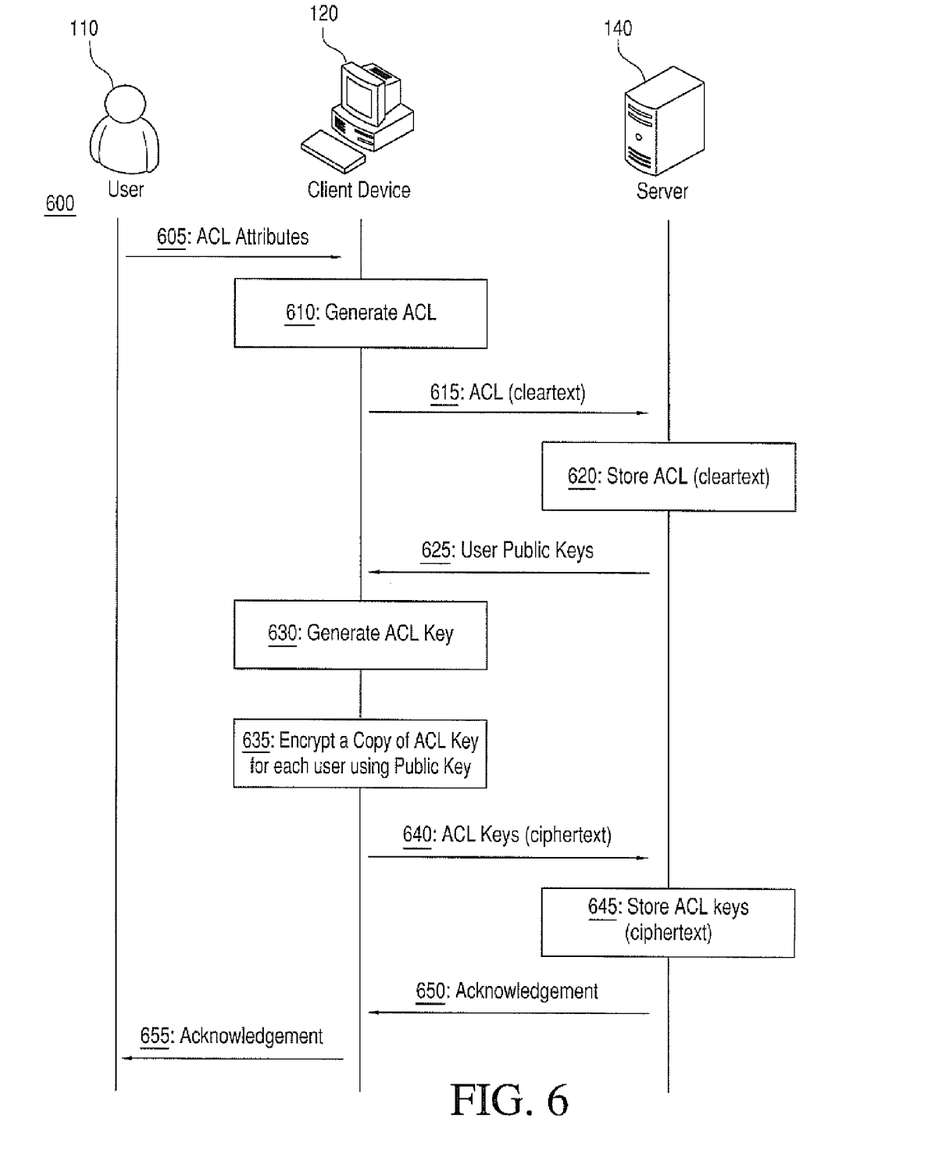
FIG. 6 illustrates an exemplary method of creating an ACL group.

FIG. 6 illustrates an exemplary method 600 of creating an ACL group. Method 600 may be performed by the various components of system 100 including user 110, client device 120, network 130, and server 140. It should be recognized that the steps performed by each individual component may be viewed as a separate method. Method 600 may involve components sending and/or receiving data. It should be recognized that sending and receiving may be viewed as separate steps for each component.

Method 600 may begin at step 605, where user 110 enters ACL attributes on client device 120. In various preferred embodiments, user 110 may enter ACL attributes using a graphical user interface (GUI) and selecting the desired options. The GUI of client device 120 may allow user 110 to search for and add users to the ACL. Client device 120 may also present user 110 with options for setting each user's permissions. Once all necessary information is entered, the method 600 may proceed to step 610.

In step 610, client device 120 may generate an ACL data structure for the new ACL group. The data structure may be similar to exemplary data structure 400. The client device 120 may create an entry for each user including the username and permissions.

In step 615, client device 120 may request the public keys associated with each username in the ACL group from server 140. Server 140 may look up the public key associated with each username in user profile storage 340. Server 140 may also enforce restrictions on the addition of a user to the new ACL group. For example, server 140 may require user authorization before the user is added to a new ACL. In step 620, server 140 may send client device 120 the public keys of each user in the new ACL group.

In step 625, client device 120 may generate a symmetric ACL key. In various preferred embodiments, client device may generate the symmetric ACL key randomly or pseudo-randomly, possibly using input provided by the user 110. The length of the symmetric ACL key may be determined by the symmetric encryption algorithm used. In step 630, client device 120 may encrypt the symmetric ACL key with each of the public keys of the users in the ACL group, generating an encrypted ACL key for each member of the group. The encrypted ACL keys may be stored in the ACL data structure. In step 635, client device 120 may send the ACL data structure including the usernames, permissions, and encrypted ACL keys to the server 140.

In step 640, server 140 may store the ACL data structure in ACL storage 350. Server 140 may generate a unique ACL identifier to identify the new ACL group and store the ACL identifier in ACL identifier field 405. In step 645, server 140 may send client device 120 an acknowledgement that the new ACL group has been stored. The acknowledgement may include the unique ACL identifier. In step 650, client device 120 may display an acknowledgement message to user 110. Method 600 may then end.

Figure 7:
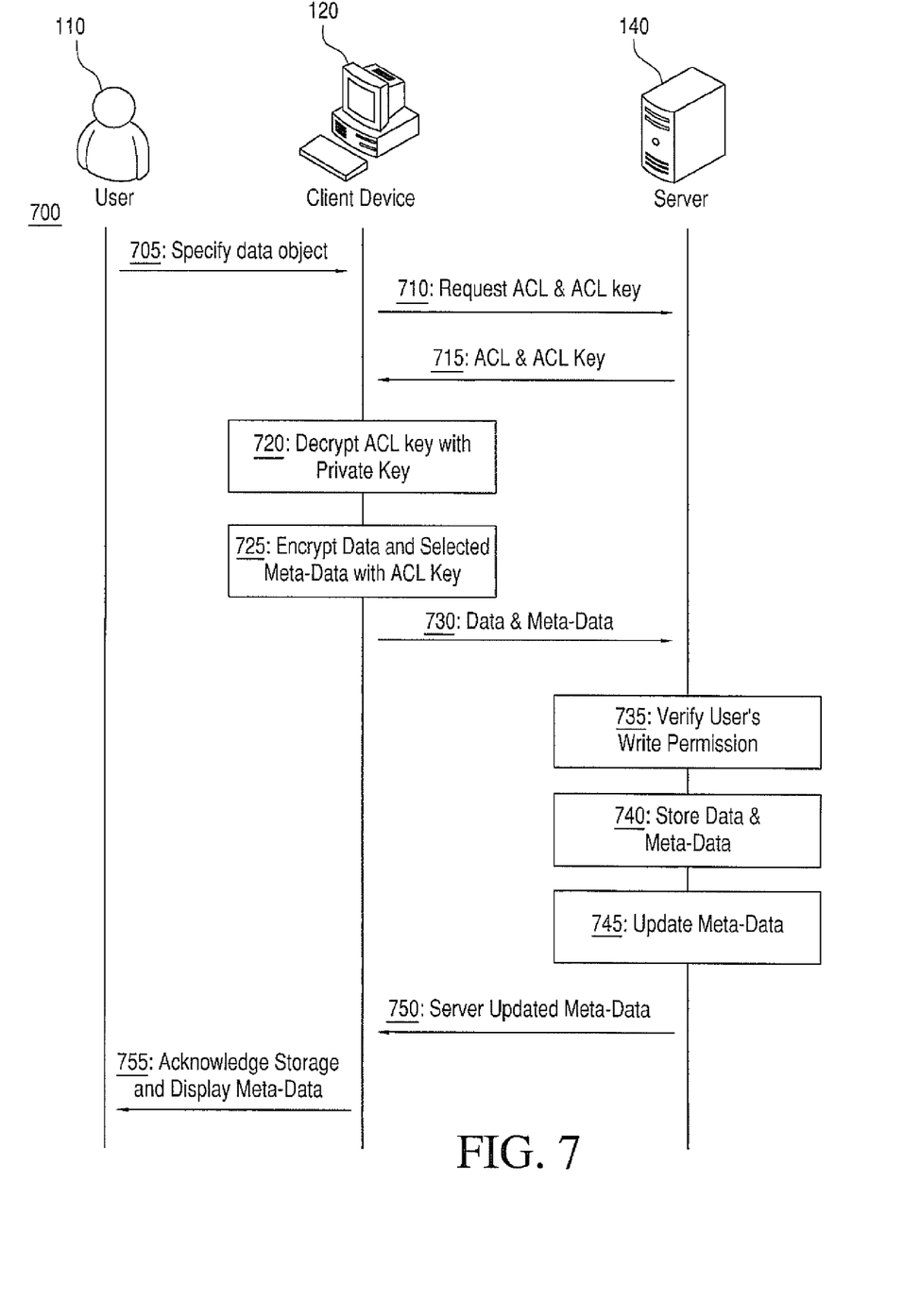
FIG. 7 illustrates an exemplary method of securely storing a data object for access by group members.

FIG. 7 illustrates an exemplary method 700 of securely storing a data object for access by ACL group members. Method 700 may be performed by the various components of system 100 including user 110, client device 120, network 130, and server 140. It should be recognized that the steps performed by each individual component may be viewed as a separate method. Method 700 may involve components sending and/or receiving data. It should be recognized that sending and receiving may be viewed as separate steps for each component.

Method 700 may begin at step 705 where a user 110 specifies a data object. User 110 may select a data object from a list displayed by client device 120. Server 140 may provide a list of available data objects to client device 120 whenever client device 120 connects to server 140. Server 140 may maintain an index of data objects associated with each ACL. A request for a data object may also include a request for meta-data associated with the object. The request may automatically include all associated meta-data, or the user 110 may select desired meta-data.

In step 710, client device 120 may send server 140 a request for ACL information including the encrypted ACL key of user 110. In step 715, server 140 may send client device 120 the requested ACL information and the encrypted ACL key of user 110. The ACL information may include the user's permissions for the ACL and identifiers of data objects associated with the ACL. In various exemplary embodiments, client device 120 may store an encrypted ACL key, and client device 120 may perform steps 710 and 715 only if an encrypted ACL key is not stored.

In step 720, client device 120 may decrypt the encrypted ACL key using the user's private key stored in private key storage 225. The user 110 may be required to enter a password or comply with other security measures to gain access to the stored private key. The decryption may be performed by asymmetric cryptographic engine 220. The resulting cleartext symmetric ACL key may be temporarily stored for use by symmetric cryptographic engine 230.

In step 725, client device 120 may encrypt the specified data object and selected meta-data with the unencrypted symmetric ACL key. Symmetric cryptographic engine 230 may perform the encryption. After the data is encrypted, client device 120 may delete the unencrypted symmetric ACL key to prevent unauthorized access.

In step 730, client device 120 may send the encrypted data and selected meta-data to server 140 along with a request to write the data object. The write request may be a request to write a new data object or a request to update an existing data object. In step 735, server 140 may verify the user's permission to write a data object associated with the ACL. Server 140 may authenticate the identity of user 110 and may determine the permissions of user 110 based on the permissions of the username in the ACL stored on server 140. If the user does not have permission to write a data object associated with the ACL, server 140 may deny the write request. In step 740, if the user does have permission to write the data object, server 140 may store the encrypted data object and selected meta-data.

In step 745, server 140 may update cleartext meta-data such as accounting records indicating the time the data object was written. In step 750, server 140 may send the updated meta-data to client device 120. In step 755, client device 120 may display an acknowledgement that the data object has been stored. The acknowledgement may also include any meta-data generated by server 140. The method 700 may then end.

Figure 8:
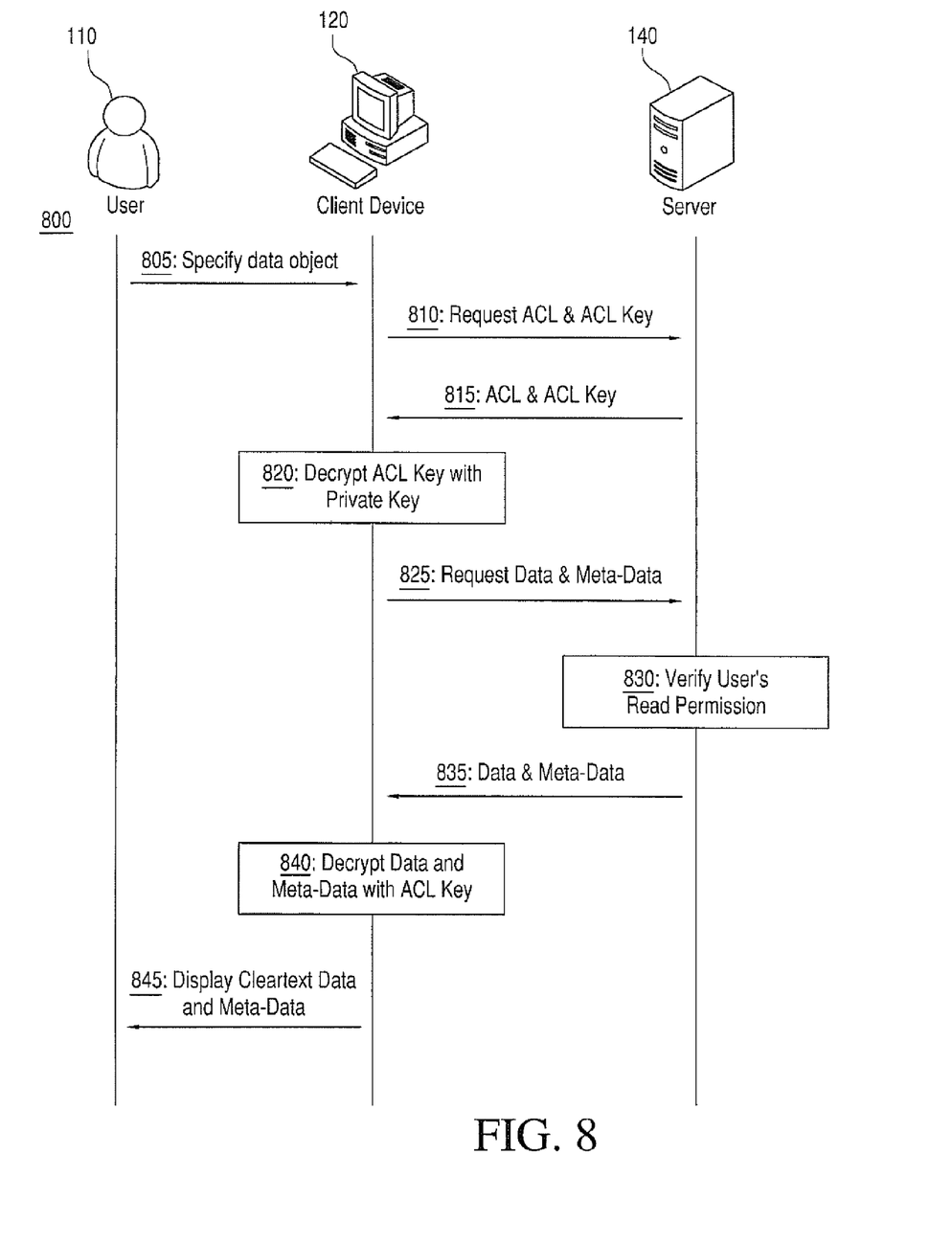
FIG. 8 illustrates an exemplary method of securely retrieving a data object from a server.

FIG. 8 illustrates an exemplary method 800 of securely retrieving a data object from a server. Method 800 may be performed by the various components of system 100 including user 110, client device 120, network 130, and server 140. It should be recognized that the steps performed by each individual component may be viewed as a separate method. Method 800 may involve components sending and/or receiving data. It should be recognized that sending and receiving may be viewed as separate steps for each component.

Method 800 may begin at step 805. User 110 may select a data object such as a file from unencrypted data storage 235. Alternatively, user 110 may create a new data object such as a message or import a data object from an external source. User 110 may also select additional meta-data to associate with the data object.

In step 810, client device 120 may send server 140 a request for ACL information including the encrypted ACL key of user 110. In step 815, server 140 may send client device 120 the requested ACL information and the encrypted ACL key of user 110. The ACL information may include the user's permissions for the ACL and identifiers of data objects associated with the ACL. In various exemplary embodiments, client device 120 may store an encrypted ACL key, and client device 120 may perform steps 810 and 815 only if an encrypted ACL key is not stored.

In step 820, client device 120 may decrypt the encrypted symmetric ACL key using the user's private key stored in private key storage 225. Asymmetric cryptographic engine 220 may decrypt the symmetric ACL key and temporarily store the unencrypted symmetric ACL key for use by symmetric cryptographic engine 230. In various alternative embodiments, step 820 may be performed or repeated after step 835.

In step 825, client device 120 may request one or more data objects and/or meta-data associated with the requested data objects. In step 830, server 140 may verify the user's permission to read data objects associated with the ACL. Server 140 may authenticate the user 110 and may determine the permissions of user 110 based on the permissions of the username in the ACL stored on server 140. Server 140 may also update meta-data such as accounting records to indicate that user 110 has attempted to access the data object. If the user does not have permission to read data objects associated with the ACL, server 140 may deny the request for the data objects. In step 835, if the user does have permission to read data objects associated with the ACL, server 140 may send client device 120 the encrypted data objects. Server 140 may also send any requested meta-data whether encrypted or cleartext.

In step 840, client device 120 may decrypt the received data objects and any encrypted meta-data using the unencrypted ACL key obtained in step 820. Symmetric cryptographic engine 230 may perform the decryption. Client device 120 may wipe the unencrypted symmetric ACL key after symmetric cryptographic engine 230 finishes decrypting the data object. In step 845, the client device 120 may store unencrypted data in unencrypted data storage 235 and/or display the unencrypted data on display 240. The method 800 may then end.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A system for storing a plurality of encrypted data objects and providing access to a group of users comprising:
   a record of user accounts, wherein at least one record for a user account includes: a user identifier, and
   a public encryption key corresponding to a private encryption key, the private encryption key known to the user and unknown to the server;
   at least one access control list (ACL) defining an access control policy for a group of users, wherein the ACL includes:
   permissions for the group of users, wherein each user of the group has access to a plurality of data objects associated with the ACL as defined by the permissions, and
   an ACL key list including, for each authorized user of the group, a copy of a symmetric ACL key corresponding to the ACL (ACL key) encrypted with the public encryption key of the user;
   a user-data non-transitory machine readable storage medium including:

encrypted user data, stored as a plurality of data objects associated with the ACL, each object encrypted with the ACL key, and cleartext meta-data that describes each data object including an identifier of the ACL associated with the data object; and an access controller configured to: receive, from a user, an access request from a user requesting access to a requested data object, and send, to the user, a copy of the requested encrypted data object to the user if the ACL associated with the data object indicates that the user has permission to access the data object; and send, to a user, the copy of the ACL key encrypted with the public key of the user, wherein an authentication controller configured to: receive data objects sent to the system by a user that have been digitally signed with the private encryption key of the user; and authenticate the data object by applying the user public key, wherein the authentication controller is further configured to: generate an accounting record including at least the identifier of the user and a time of receipt; and store the accounting record as meta-data associated with the data object.

2. The system of claim 1, wherein the plurality of data objects are messages, and all messages for the group of users are associated with the same ACL.

3. The system of claim 1, wherein the user-data machine readable storage medium further includes encrypted meta-data including an encrypted namespace.

4. The system of claim 1, wherein the permissions are stored as cleartext.

5. The system of claim 1, wherein the record of user accounts includes at least one administrative account and the record of at least one other user account is linked to the administrative account, wherein the access control module requires an administrative account to have access to any ACL to which the linked user account has access.

6. A method performed by a computer server for securely storing a plurality of encrypted data objects:

receiving, from a client device associated with a first user, a request for an Access Control List (ACL) stored on the server, the ACL including:

permissions for a group of users, wherein each authorized user of the group has access to a plurality of data objects associated with the ACL as defined by the permissions, and an ACL key list including, for each authorized user of the group, a copy of a symmetric ACL key corresponding to the ACL (ACL key) encrypted with a public encryption key of the authorized user;

transmitting ACL information including the encrypted ACL key for the first user to the client device;

receiving, from the client device, a write request including a data object encrypted with the decrypted ACL key and meta-data including at least an identifier of the ACL and an identifier of the data object;

verifying the permission of the first user to write according to the ACL by comparing an identifier of the first user with permissions of the first user in the ACL stored on the server; and adding the data object and meta-data to the plurality of data objects associated with the ACL on the server only if the first user has permission to write according to the ACL, wherein the step of verifying comprises: verifying the identity of the first user by decrypting a digital signature on the data object using the public key of the first user stored on the server; generating an accounting record of the write request; and storing the accounting record as meta-data describing the data object.

7. The method of claim 6, wherein the data object is not a file, and the meta-data describes raw disk partitions for locating the data object.

8. The method of claim 6, further comprising:

receiving, from a client device, a request to revoke access to data objects associated with an ACL, the request including a new ACL and an identifier of a requesting user;

verifying the permission of the requesting user to change the ACL by comparing the identifier of the requesting user with the permissions in the stored ACL;

storing the new ACL on the server if the requesting user has permission to change the ACL.

9. The method of claim 8, wherein the new ACL includes a new ACL key list including, for each user of the group, a copy of a new symmetric ACL key encrypted with the public encryption key of the user.

10. The method of claim 6, wherein the ACL includes a plurality of encrypted ACL keys for at least one user in the group and the meta-data for each data object further includes an identifier of the ACL key used to encrypt the data object.

11. The method of claim 6, further comprising:

receiving, from a client device, a request for a data object or meta-data describing a data object, the request including an identifier of a requesting user;

verifying the permission of the requesting user to read data objects within the ACL by comparing the identifier of the requesting user with the permissions in the stored ACL;

sending, to the client device, if the requesting user has permission, the requested data object or requested meta-data.

12. The method of claim 6, further comprising:

receiving, from a client device, a request for ACL information of an ACL;

verifying the permission of the requesting user to read data objects associated with the ACL by comparing the identifier of the requesting user with the permissions in the stored ACL;

searching stored meta-data for data objects associated with the ACL;

sending, to a client device, ACL information including a list of data objects associated with the ACL.

* * * * *